(12) United States Patent
Hahn et al.

(10) Patent No.: US 7,868,053 B2
(45) Date of Patent: Jan. 11, 2011

(54) EXPANDABLE POLYSTYRENE GRANULATES WITH A BI- OR MULTI-MODAL MOLECULAR-WEIGHT DISTRIBUTION

(75) Inventors: Klaus Hahn, Kirchheim (DE); Gerd Ehrmann, Deidesheim (DE); Joachim Ruch, Wachenheim (DE); Markus Allmendinger, Meckenheim (DE); Bernhard Schmied, Frankenthal (DE); Jan Holoch, Leimen (DE); Franz-Josef Dietzen, Haβloch (DE)

(73) Assignee: BASF SE, Ludwigshafen (DE)

( * ) Notice: Subject to any disclaimer, the term of this patent is extended or adjusted under 35 U.S.C. 154(b) by 898 days.

(21) Appl. No.: 10/596,262

(22) PCT Filed: Dec. 10, 2004

(86) PCT No.: PCT/EP2004/014071
§ 371 (c)(1),
(2), (4) Date: Jun. 7, 2006

(87) PCT Pub. No.: WO2005/056655
PCT Pub. Date: Jun. 23, 2005

(65) Prior Publication Data
US 2008/0281004 A1 Nov. 13, 2008

(30) Foreign Application Priority Data
Dec. 12, 2003 (DE) ................. 103 58 804

(51) Int. Cl.
*C08J 9/16* (2006.01)
*C08J 9/00* (2006.01)

(52) U.S. Cl. .............. 521/59; 521/139; 521/79; 521/60; 524/241; 525/50; 525/55

(58) Field of Classification Search .......... 521/59, 521/139, 60, 79; 524/241; 525/50, 55
See application file for complete search history.

(56) References Cited

U.S. PATENT DOCUMENTS

| | | | |
|---|---|---|---|
| 3,817,669 A | 6/1974 | Buckner | |
| 4,663,357 A * | 5/1987 | Meyer et al. | 521/59 |
| 4,665,103 A * | 5/1987 | DiGiulio | 521/57 |
| 4,673,694 A * | 6/1987 | Meyer et al. | 521/59 |
| 4,990,540 A * | 2/1991 | Hahn et al. | 521/56 |
| 5,000,891 A | 3/1991 | Green | |
| 5,010,111 A * | 4/1991 | Hahn et al. | 521/56 |
| 5,104,903 A * | 4/1992 | Hahn et al. | 521/56 |
| 5,334,657 A * | 8/1994 | Swartzmiller et al. | 525/71 |
| 5,496,864 A * | 3/1996 | Henn et al. | 521/59 |
| 5,525,636 A * | 6/1996 | Henn et al. | 521/59 |
| 5,905,096 A * | 5/1999 | Lay et al. | 521/56 |
| 5,908,872 A | 6/1999 | Gluck et al. | |
| 6,093,750 A | 7/2000 | Craig et al. | |
| 6,340,713 B1 | 1/2002 | Gluck et al. | |
| 6,465,533 B1 | 10/2002 | Eberstaller et al. | |
| 6,783,710 B1 | 8/2004 | Walder | |
| 7,282,552 B1 * | 10/2007 | Sosa et al. | 526/329.2 |
| 7,776,244 B2 * | 8/2010 | Dietzen et al. | 264/142 |
| 2003/0162852 A1 | 8/2003 | Chaudhary et al. | |
| 2005/0156344 A1* | 7/2005 | Dietzen et al. | 264/51 |
| 2006/0167123 A1* | 7/2006 | Dietzen et al. | 521/79 |

FOREIGN PATENT DOCUMENTS

| | | |
|---|---|---|
| DE | 10241298 A1 * | 3/2004 |
| EP | 0 126 459 | 11/1984 |
| EP | 0 305 862 | 3/1989 |
| EP | 668 139 | 8/1995 |
| EP | 0 909 782 | 4/1999 |
| EP | 0 915 126 | 5/1999 |
| GB | 1062307 | 3/1967 |
| JP | 2002226622 | 8/2002 |
| WO | WO-98/51735 A1 | 11/1998 |
| WO | WO-00/43442 | 7/2000 |
| WO | WO-03/053651 | 7/2003 |

* cited by examiner

*Primary Examiner*—Mark Eashoo
*Assistant Examiner*—Jane L Stanley
(74) *Attorney, Agent, or Firm*—Connolly Bove Lodge & Hutz LLP

(57) ABSTRACT

Expandable pelletized styrene polymer materials with at least bi- or multimodal molecular weight distribution, to a process for their preparation, and to use for producing moldable-foam moldings.

10 Claims, No Drawings

EXPANDABLE POLYSTYRENE GRANULATES WITH A BI- OR MULTI-MODAL MOLECULAR-WEIGHT DISTRIBUTION

CROSS REFERENCE TO RELATED APPLICATION

The present application is a National Stage application of PCT/EP2004/014071, filed Dec. 10, 2004, which claims priority from German Patent Application No. 10358804.3, filed Dec. 12, 2003.

The invention relates to expandable pelletized styrene polymer materials with at least bi- or multimodal molecular weight distribution, to a process for their preparation, and to use for producing moldable-foam moldings.

A process for preparing expandable styrene polymers, such as expandable polystyrene (EPS) via suspension polymerization has been known for a long time. A disadvantage of these processes is that large amounts of waste water arise and have to be discarded. The polymers have to be dried in order to remove internal water. In addition, the suspension polymerization generally gives broad bead size distributions which require complicated sieving to give various bead fractions.

Extrusion processes can also be used to prepare expanded and expandable styrene polymers. Here, the blowing agent is incorporated by mixing, by way of example, through an extruder into the polymer melt, and the material is passed through a die plate and divided to give particles or strands (U.S. Pat. No. 3,817,669, GB 1,062,307, EP-B 0 126 459, U.S. Pat. No. 5,000,891).

EP-A 668 139 describes a process for the cost-effective preparation of expandable pelletized polystyrene material (EPS) where static mixing elements are used to prepare the melt comprising blowing agent in a dispersion, retention, and cooling stage, and the material is then pelletized. The dissipation of large amounts of heat is required, because the melt is cooled to a few degrees above the solidification point.

Various pelletization processes have been proposed for substantial prevention of post-extrusion foaming, e.g. underwater pelletization (EP-A 305 862), spray mist (WO 03/053651), or atomization (U.S. Pat. No. 6,093,750).

WO 98/51735 describes expandable styrene polymers comprising graphite particles and having reduced thermal conductivity, and obtainable via suspension polymerization or via extrusion in a twin-screw extruder. Because of the high shear forces in a twin-screw extruder, significant molecular weight degradation of the polymer used, and/or some decomposition of additives, such as flame retardant, is/are usually observed.

Factors of decisive importance for giving the foams ideal insulation properties and good surfaces are the number of cells and the foam structure obtained during foaming of the expandable styrene polymers (EPSs). The pelletized EPS materials prepared via extrusion are frequently not capable of foaming to give foams with ideal foam structure.

It was an object of the present invention to provide expandable pelletized styrene polymer materials with improved expansion capability. The foam beads obtainable therefrom via prefoaming should moreover have better fusibility and give moldable-foam moldings with a foam surface free from interstices.

This has led to the discovery of expandable pelletized styrene polymer materials with at least bi- or multimodal molecular weight distribution.

The bi- or multimodal molecular weight distribution may, by way of example, be achieved in a controlled manner via mixing and melting of styrene polymers of different average molecular weights. It is preferable to use mixtures composed of a low-molecular-weight styrene polymer with a weight-average molar mass $M_w$ in the range from 1000 to 20 000 g/mol, in particular in the range from 2000 to 10 000 g/mol, and of a high-molecular-weight styrene polymer with a weight-average molar mass $M_w$ in the range from 160 000 to 400 000 g/mol, preferably in the range from 220 000 to 300 000 g/mol.

The amounts generally used of the low-molecular-weight styrene polymer are in the range from 0.1 to 30% by weight, preferably in the range from 1 to 10% by weight, based on the styrene polymer mixture. At proportions of up to 2% by weight of the low-molecular-weight styrene polymer, based on the styrene polymer mixture, there is found to be no significant lowering of the glass transition temperature of the expandable pelletized styrene polymer material, and therefore of the heat resistance of the foam molding produced therefrom.

At proportions in the range from 3 to 8% by weight of the low-molecular-weight styrene polymer, markedly improved expandability is achieved.

It is particularly preferable to use mixtures composed of
i) from 0.1 to 30% by weight of a styrene copolymer, e.g. a copolymer composed of styrene, acrylic acid, and/or a-methylstyrene, with a weight-average molar mass $M_w$ in the range from 1000 to 20 000 g/mol, in particular in the range from 2000 to 10 000 g/mol, and
ii) from 99.9 to 70% by weight of standard polystyrene (GPPS) or impact-resistant polystyrene (HIPS) with a weight-average molar mass $M_w$ in the range from 160 000 to 400 000 g/mol, preferably in the range from 220 000 to 300 000 g/mol.

Styrene polymers preferably used are glass-clear polystyrene (GPPS), impact-resistant polystyrene (HIPS), anionically polymerized polystyrene or impact-resistant polystyrene (AIPS), styrene-α-methylstyrene copolymers, acrylonitrile-butadiene-styrene polymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) polymers, or mixtures of these or with polyphenylene ether (PPE).

In order to improve mechanical properties or thermal stability, the styrene polymers mentioned may be blended with thermoplastic polymers, such as polyamides (PAs), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or mixtures of these, generally in total proportions up to a maximum of 30% by weight, preferably in the range from 1 to 10% by weight, based on the polymer melt, where appropriate with use of compatibilizers. Mixtures within the ranges of amounts mentioned are also possible with, by way of example, hydrophobically modified or functionalized polymers or oligomers, rubbers, such as polyacrylates or polydienes, e.g. styrene-butadiene block copolymers, or biodegradable aliphatic or aliphatic/aromatic copolyesters.

Examples of suitable compatibilizers are maleic-anhydride-modified styrene copolymers, polymers containing epoxy groups, and organosilanes.

Recycled polymers comprising the thermoplastic polymers mentioned, in particular styrene polymers and expandable styrene polymers (EPSs) may also be admixed with the styrene polymer melt in amounts which do not substantially impair its properties, generally in amounts of at most 50% by weight, in particular in amounts of 1 to 20% by weight.

The styrene polymer melt comprising blowing agent generally comprises one or more blowing agents homogeneously distributed in a total proportion of from 2 to 10% by weight, preferably from 3 to 7% by weight, based on the styrene polymer melt comprising blowing agent. Suitable blowing agents are the physical blowing agents usually used in EPS, such as aliphatic hydrocarbons having from 2 to 7 carbon atoms, alcohols, ketones, ethers, or halogenated hydrocarbons. Preference is given to use of isobutane, n-butane, isopentane, n-pentane.

To improve foamability, finely dispersed droplets of internal water may be introduced into the styrene polymer matrix. An example of the method for this is the addition of water into the molten styrene polymer matrix. The location of addition of the water may be upstream of, together with, or downstream of, the blowing agent feed. Homogeneous distribution of the water may be achieved by using dynamic or static mixers.

An adequate amount of water, based on the styrene polymer, is generally from 0 to 2% by weight, preferably from 0.05 to 1.5% by weight.

Expandable styrene polymers (EPSS) with at least 90% of the internal water in the form of droplets of internal water with diameter in the range from 0.5 to 15 μm form, on foaming, foams with an adequate number of cells and with homogeneous foam structure.

The amount added of blowing agent and of water is selected in such a way that the expansion capability a of the expandable styrene polymers (EPSs), defined as bulk density prior to foaming/bulk density after foaming, is at most 125, preferably from 25 to 100.

The bulk density of the inventive expandable pelletized styrene polymer materials (EPSs) is generally at most 700 g/l, preferably in the range from 590 to 660 g/l. If fillers are used, bulk densities in the range from 590 to 1200 g/l may arise, depending on the nature and amount of the filler.

Additives, nucleating agents, fillers, plasticizers, flame retardants, soluble and insoluble inorganic and/or organic dyes and pigments, e.g. IR absorbers, such as carbon black, graphite, or aluminum powder may moreover be added, together or with spatial separation, to the styrene polymer melt, e.g. by way of mixers or ancillary extruders. The amounts added of the dyes and pigments are generally in the range from 0.01 to 30% by weight, preferably in the range from 1 to 5% by weight. For homogeneous and microdisperse distribution of the pigments within the styrene polymer, it can be advantageous, particularly in the case of polar pigments, to use a dispersing agent, e.g. organosilanes, polymers containing epoxy groups, or maleic-anhydride-grafted styrene polymers. Preferred plasticizers are mineral oils, and phthalates, which may be used in amounts of from 0.05 to 10% by weight, based on the styrene polymer.

To prepare the inventive expandable styrene polymers, the blowing agent is mixed into the polymer melt. The process encompasses the stages of a) melt production, b) mixing, c) cooling, d) transport, and e) pelletizing. Each of these stages may be executed using the apparatus or combinations of apparatus known from plastics processing. Static or dynamic mixers, such as extruders, are suitable for this mixing process. The polymer melt may be taken directly from a polymerization reactor, or produced directly in the mixing extruder, or in a separate melting extruder via melting of polymer pellets. The cooling of the melt may take place in the mixing assemblies or in separate coolers. Examples of pelletizers which may be used are pressurized underwater pelletizers, pelletizers with rotating knives and cooling via spray-misting of temperature-control liquids, or pelletizers involving atomization. Examples of suitable arrangements of apparatus for carrying out the process are:

a) polymerization reactor—static mixer/cooler—pelletizer
b) polymerization reactor—extruder—pelletizer
c) extruder—static mixer—pelletizer
d) extruder—pelletizer The arrangement may also have ancillary extruders for introducing additives, e.g. solids or heat-sensitive additives.

The temperature of the styrene polymer melt comprising blowing agent when it is passed through the die plate is generally in the range from 140 to 300° C., preferably in the range from 160 to 240° C. Cooling to the region of the glass transition temperature is not necessary.

The die plate is heated at least to the temperature of the polystyrene melt comprising blowing agent. The temperature of the die plate is preferably above the temperature of the polystyrene melt comprising blowing agent by from 20 to 100° C. This avoids polymer deposits in the dies and ensures problem-free pelletization.

In order to obtain marketable pellet sizes, the diameter (D) of the die holes at the discharge from the die should be in the range from 0.2 to 1.5 mm, preferably in the range from 0.3 to 1.2 mm, particularly preferably in the range from 0.3 to 0.8 mm. Even after die swell, this permits controlled setting of pellet sizes below 2 mm, in particular in the range from 0.4 to 1.4 mm.

Die swell can be effected not only by the molecular weight distribution but also by the geometry of the die. The die plate preferably has holes with an L/D ratio of at least 2, where the length (L) indicates that region of the die whose diameter is at most the diameter (D) at the discharge from the die. The L/D ratio is preferably in the range from 3-20.

The diameter (E) of the holes at the entry to the die in the die plate should generally be at least twice as large as the diameter (D) at the discharge from the die.

One embodiment of the die plate has holes with conical inlet and an inlet angle α smaller than 180°, preferably in the range from 30 to 120°. In another embodiment, the die plate has holes with a conical outlet and an outlet angle β smaller than 90°, preferably in the range from 15 to 45°. In order to produce controlled pellet size distributions in the styrene polymers, the die plate may be equipped with holes of different discharge diameter (D). The various embodiments of die geometry may also be combined with one another.

One particularly preferred process for preparing expandable styrene polymers with bimodal molecular weight distribution encompasses the steps of a) polymerization of styrene monomer and, where appropriate, copolymerizable monomers, to give a styrene polymer whose average molar mass is in the range from 160 000 to 400 000 g/mol,
b) devolatilization of the resultant styrene polymer melt,
c) incorporating, by mixing, a low-molecular-weight styrene polymer whose average molar mass $M_w$ is in the range from 1000 to 20 000 g/mol,
d) incorporating, by mixing, the blowing agent and, where appropriate, additives into the styrene polymer melt, using a static or dynamic mixer at a temperature of at least 150° C., preferably from 180 to 260° C.,
e) cooling the styrene polymer melt comprising blowing agent to a temperature of at least 120° C., preferably from 150 to 200° C.,
f) discharge via a die plate with holes whose diameter at the discharge from the die is at most 1.5 mm, and
g) pelletizing the melt comprising blowing agent.

The pelletizing process in step g) may take place directly downstream of the die plate under water at a pressure in the range from 1 to 25 bar, preferably from 5 to 15 bar.

Because of the polymerization in stage a) and devolatilization in stage b), a polymer melt is directly available for blowing agent impregnation in stage d), and no melting of styrene polymers is necessary. This is not only more cost-effective, but also gives expandable styrene polymers (EPSs) with low styrene monomer contents, because it avoids exposure to mechanical shear in the homogenizing section of an extruder—exposure which generally leads to breakdown of polymers to give monomers. In order to keep the styrene monomer content low, in particular below 500 ppm, it is also advantageous to minimize the amount of mechanical and thermal energy introduced in all of the subsequent stages of the process. Particular preference is therefore given to shear rates below 50/sec, preferably from 5 to 30/sec, and temperatures below 260° C., and also to short residence times in the range from 1 to 20 minutes, preferably from 2 to 10 minutes, in stages d) to f). It is particularly preferable to use exclusively static mixers and static coolers in the entire process. The polymer melt may be transported and discharged via pressure pumps, e.g. gear pumps.

Another method of reducing styrene monomer content and/or residual solvent, such as ethylbenzene, consists in providing a high level of devolatilization in stage b), using entrainers, such as water, nitrogen, or carbon dioxide, or carrying out the polymerization stage a) by an anionic route. Anionic polymerization of styrene not only gives styrene polymers with low styrene monomer content but also gives very low styrene oligomer contents.

To improve processability, the finished expandable pelletized styrene polymer materials may be coated by glycerol esters, antistatic agents, or anticaking agents.

The inventive expandable pelletized styrene polymer materials cake less than pellets which comprise low-molecular-weight plasticizers, and have low pentane loss during storage. The inventive expandable pelletized styrene polymer materials may be prefoamed in a first step by means of hot air or steam to give foam beads whose density is in the range from 8 to 100 g/l, and may be fused in a 2nd step in a closed mold to give moldable-foam moldings.

EXAMPLES

Starting Materials

PS 158 K polystyrene from BASF Aktiengesellschaft with a viscosity number VN of 98 ml/g ($M_w$=280 000 g/mol, polydispersity $M_w/M_n$=2.8)

PS 138 F polystyrene from BASF Aktiengesellschaft with a viscosity number VN of 75 ml/g ($M_w$=195 000, $M_w/M_n$=2.7)

styrene copolymer (SC) composed of styrene, acrylic acid, and α-methylstyrene with a weight-average molar mass $M_w$=3000 g/mol, glass transition temperature Tg of 56° C. (Joncryl® ADF 1300 from Johnson Polymers)

Examples 1-4

For the examples, a polystyrene melt was prepared from PS 158 K polystyrene and SC with the proportions by weight of Table 1, and 6% by weight of n-pentane, based on the polymer melt, were also incorporated by mixing. The melt mixture comprising blowing agent was cooled from an initial 260° C. to 190° C., and passed at 60 kg/h throughput through a die plate with 32 holes (die diameter 0.75 mm). A compact pelletized material with narrow size distribution was prepared with the aid of a pressurized underwater pelletizer. Table 1 gives the pentant contents measured in the pelletized material after pelletization and after 14 days of storage.

These pelletized materials were prefoamed in a current of steam to give foam beads (30 g/l), held in intermediate storage for 12 hours, and then fused in gas-tight molds using steam, to give foams.

To assess the fusion of the foam beads, a test specimen of foam, thickness 4 cm, was broken apart, and the proportion of fractured foam beads and intact beads on the fracture surface was determined. The fracture fusion factor characterizes the cohesion of the beads and is therefore a measure of mechanical properties, such as flexural behavior. Surface quality was assessed as shown in Table 1.

Table 2 shows the expandability of the pelletized materials. At higher SC content there is a marked reduction in the very low bulk density, which is achieved more rapidly.

TABLE 1

Characterization and properties for Examples 1-4:

| Example | PS 158/SC | Pentane content [% by weight] | Pentane content 14 d [% by weight] | Fusion [%] | Surface quality |
|---------|-----------|-------------------------------|------------------------------------|------------|-----------------|
| 1 | 100/0 | 5.3 | 5.1 | 80 | satisfactory |
| 2 | 98/2 | 5.4 | 4.9 | 90 | good |
| 3 | 94/6 | 5.3 | 4.8 | 95 | very good |
| 4 | 90/10 | 5.1 | 4.7 | 95 | very good |

TABLE 2

Expandability of pelletized material from Examples 1-4 (bulk density [g/l])

| Foaming time [sec] | Example 1 | Example 2 | Example 3 | Example 4 |
|--------------------|-----------|-----------|-----------|-----------|
| 2 | 23.7 | 25 | 20.8 | 19.2 |
| 3 | 21.7 | 20.8 | 16.7 | 15.2 |
| 4 | 20.0 | 18.5 | 14.7 | 16.1 |
| 5 | 19.2 | 16.7 | 14.7 | 17.9 |
| 6 | 18.5 | 16.1 | 16.1 | 19.2 |
| 8 | 16.7 | 16.7 | 20.0 | |
| 10 | 15.6 | 17.2 | 21.7 | |

Examples 5-7

The polystyrene melt comprising blowing agent (6% by weight of n-pentane) was extruded at 100 kg/h throughput through a die plate with 300 holes (diameter (D) at discharge from the die 0.4 mm). The melt temperature was 160° C. The resultant expandable pelletized polystyrene materials had uniform pellet diameter of 1.0 mm. The resultant pelletized materials were then expanded, using a current of steam, and expansion capability was determined.

| Example | Polymer mixture | $M_w/M_n$ | Expansion capability |
|---------|-----------------|-----------|----------------------|
| 5 | PS 158K | 2.8 | 28 |
| 6 | PS 138 F | 2.7 | 29 |
| 7 | PS 158 K/PS 138 F = 50/50 | 3.4 | 47 |

The invention claimed is:

1. An expandable, pelletized styrene polymer material having a bi- or multimodal molecular weight distribution, which, based in each case on the entire styrene polymer content, consists essentially of:
   i) from 0.1 to 30% by weight of a styrene copolymer with a weight-average molar mass $M_w$ in the range from 1000 to 20 000 g/mol, and
   ii) from 99.9 to 70% by weight of standard polystyrene (GPPS) with a weight-average molar mass $M_w$ in the range from 160 000 to 400 000 g/mol.

2. The expandable, pelletized styrene polymer according to claim 1 wherein the styrene copolymer used comprises a copolymer composed of styrene, acrylic acid and/or α-methylstyrene.

3. The expendable, pelletized styrene polymer material according to claim 2, which comprises from 3 to 7% by weight of an organic blowing agent.

4. The expandable, pelletized styrene polymer material according to claim 1 which comprises from 3 to 7% by weight of an organic blowing agent.

5. The expandable, pelletized styrene polymer material according to claim 1 wherein the standard polystyrene (GPPS) has a weight-average molar mass $M_w$ in the range from 220 000 to 300 000 g/mol.

6. A process for producing moldable-foam moldings, which comprises, in a first step, using hot air or steam to prefoam expandable, pelletized styrene polymer materials according to claim 1 to give foam beads whose density is in the range from 8 to 100 g/l, and, in a 2nd step, fusing these materials in a closed mold.

7. A process for preparing expandable, pelletized styrene polymer materials having a bi- or multimodal molecular weight distribution, comprising the steps of a) preparing a mixture of styrene polymers which, based in each case on the entire styrene polymer contents comprise
   i) from 0.1 to 30% by weight of a styrene copolymer with a weight-average molar mass $M_w$ in the range from 1000 to 20 000 g/mol, and
   ii) from 99.9 to 70% by weight of standard polystyrene (GPPS) with a weight-average molar mass $M_w$ in the range from 160 000 to 400 000 g/mol,
b) mixing to incorporate an organic blowing agent into the polymer melt by means of a static or dynamic mixer at a temperature of at least 150° C.,
c) cooling the polymer melt comprising blowing agent to a temperature of at least 120° C.,
d) discharge via a die plate with holes whose diameter at the discharge from the die is at most 1.5 mm, and e) pelletizing the melt comprising blowing agent directly downstream of the die plate under water at a pressure in the range from 1 to 25 bar.

8. An expandable, pelletized styrene polymer obtained according to the method of claim 7, wherein the styrene copolymer used comprises a copolymer composed of styrene, acrylic acid and/or α-methylstyrene.

9. An expandable, pelletized styrene polymer material obtained according to the method of claim 7 which comprises from 3 to 7% by weight of an organic blowing agent.

10. An expandable, pelletized styrene polymer material obtained according to the method of claim 7, wherein the standard polystyrene (GPPS) has a weight-average molar mass $M_w$ in the range from 220 000 to 300 000 g/mol.

* * * * *